US012783524B1

(12) United States Patent
Harrer et al.

(10) Patent No.: US 12,783,524 B1
(45) Date of Patent: Nov. 3, 2026

(54) ACCUMULATED STATUS IN A CHANGE LOG USING SCRIPT

(71) Applicant: SAP SE, Walldorf (DE)

(72) Inventors: Karl Harrer, Landshut (DE); Nadja Mueller-Seip, Munich (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/282,226

(22) Filed: Jul. 28, 2025

(51) Int. Cl.
*G06F 16/2455* (2019.01)
*G06F 16/23* (2019.01)

(52) U.S. Cl.
CPC .... *G06F 16/24553* (2019.01); *G06F 16/2358* (2019.01)

(58) Field of Classification Search
None
See application file for complete search history.

(56) References Cited

U.S. PATENT DOCUMENTS

2014/0365537 A1* 12/2014 Zhao ..................... G06F 3/0632 709/224
2023/0066178 A1* 3/2023 Ouyang .............. G06F 9/44505
2023/0385276 A1* 11/2023 Bok .................. G06F 16/24542
2025/0208942 A1* 6/2025 Singarayar .......... G06F 11/0709

* cited by examiner

*Primary Examiner* — Christopher J Raab
(74) *Attorney, Agent, or Firm* — SCHWEGMAN LUNDBERG & WOESSNER, P.A.

(57) ABSTRACT

In an example embodiment, a script is provided that automatically converts the active statuses at any given point in time in the status log table into a sum of binary numbers. Each status identifier is assigned to a different position of a binary number. The value of the binary number can be used to indicate which status indicators are set and which are not set. Changes to a status indicator can then be set to cause a corresponding rise or fall in the corresponding position of the binary number. The script may then condense rows having identical timestamps and perform an inner join with the status table. Texts for the status indicators may then be added and aggregated and added to the status log table. The resultant status log table provides a more efficient and clear mechanism for storing and viewing the status indicators at any particular point in time.

20 Claims, 13 Drawing Sheets

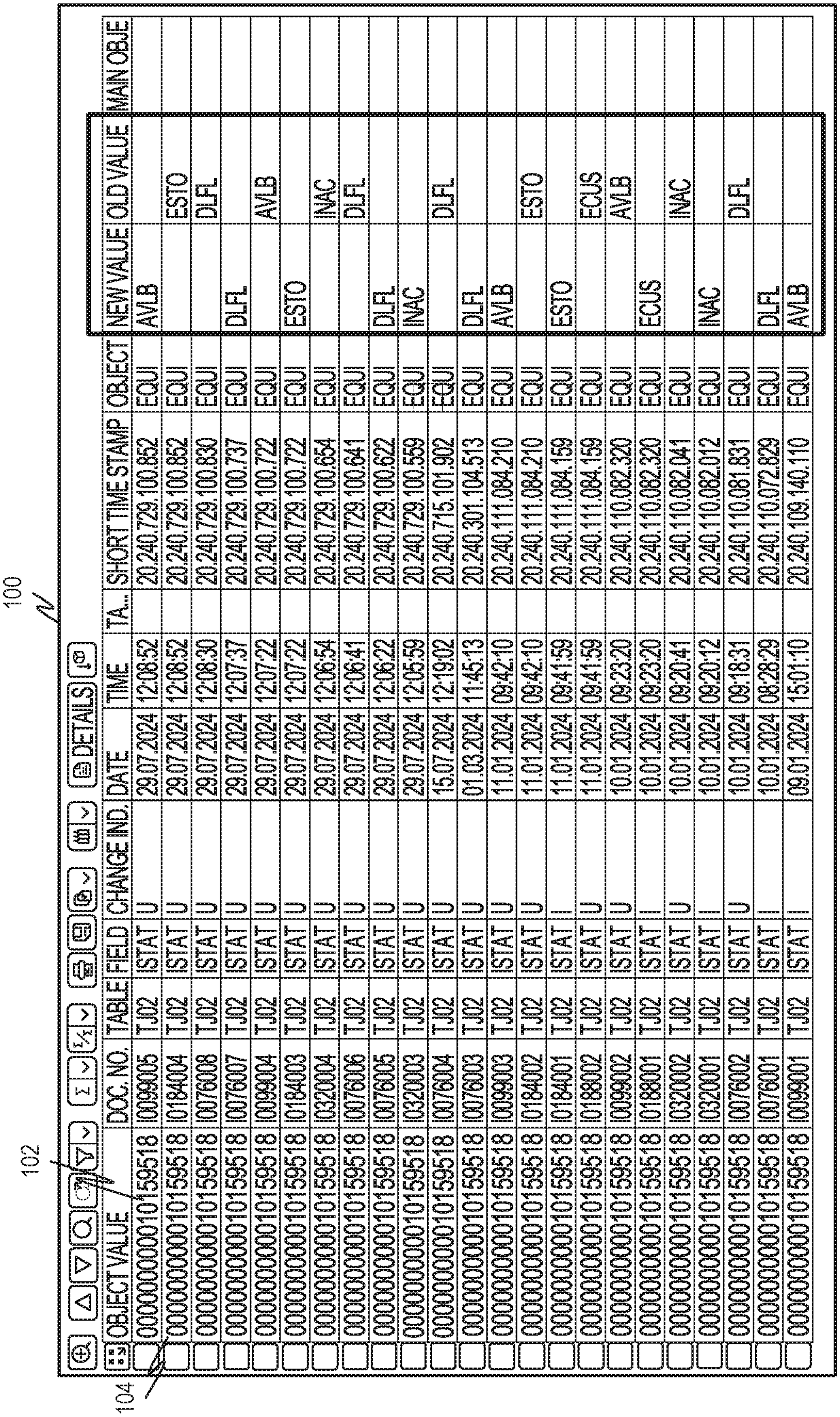

| OBJECT VALUE | DOC. NO. | TABLE | FIELD | CHANGE IND. | DATE | TIME | TA... | SHORT TIME STAMP | OBJECT | NEW VALUE | OLD VALUE | MAIN OBJE |
|---|---|---|---|---|---|---|---|---|---|---|---|---|
| 000000000010159518 | I0099005 | TJ02 | ISTAT | U | 29.07.2024 | 12:08:52 | | 20.240.729.100.852 | EQUI | AVLB | | |
| 000000000010159518 | I0184004 | TJ02 | ISTAT | U | 29.07.2024 | 12:08:52 | | 20.240.729.100.852 | EQUI | | ESTO | |
| 000000000010159518 | I0076008 | TJ02 | ISTAT | U | 29.07.2024 | 12:08:30 | | 20.240.729.100.830 | EQUI | | DLFL | |
| 000000000010159518 | I0076007 | TJ02 | ISTAT | U | 29.07.2024 | 12:07:37 | | 20.240.729.100.737 | EQUI | DLFL | | |
| 000000000010159518 | I0099004 | TJ02 | ISTAT | U | 29.07.2024 | 12:07:22 | | 20.240.729.100.722 | EQUI | | AVLB | |
| 000000000010159518 | I0184003 | TJ02 | ISTAT | U | 29.07.2024 | 12:07:22 | | 20.240.729.100.722 | EQUI | ESTO | | |
| 000000000010159518 | I0320004 | TJ02 | ISTAT | U | 29.07.2024 | 12:06:54 | | 20.240.729.100.654 | EQUI | | INAC | |
| 000000000010159518 | I0076006 | TJ02 | ISTAT | U | 29.07.2024 | 12:06:41 | | 20.240.729.100.641 | EQUI | | DLFL | |
| 000000000010159518 | I0076005 | TJ02 | ISTAT | U | 29.07.2024 | 12:06:22 | | 20.240.729.100.622 | EQUI | DLFL | | |
| 000000000010159518 | I0320003 | TJ02 | ISTAT | U | 29.07.2024 | 12:05:59 | | 20.240.729.100.559 | EQUI | INAC | | |
| 000000000010159518 | I0076004 | TJ02 | ISTAT | U | 15.07.2024 | 12:19:02 | | 20.240.715.101.902 | EQUI | | DLFL | |
| 000000000010159518 | I0076003 | TJ02 | ISTAT | U | 01.03.2024 | 11:45:13 | | 20.240.301.104.513 | EQUI | DLFL | | |
| 000000000010159518 | I0099003 | TJ02 | ISTAT | U | 11.01.2024 | 09:42:10 | | 20.240.111.084.210 | EQUI | AVLB | | |
| 000000000010159518 | I0184002 | TJ02 | ISTAT | U | 11.01.2024 | 09:42:10 | | 20.240.111.084.210 | EQUI | | ESTO | |
| 000000000010159518 | I0184001 | TJ02 | ISTAT | I | 11.01.2024 | 09:41:59 | | 20.240.111.084.159 | EQUI | ESTO | | |
| 000000000010159518 | I0188002 | TJ02 | ISTAT | U | 11.01.2024 | 09:41:59 | | 20.240.111.084.159 | EQUI | | ECUS | |
| 000000000010159518 | I0099002 | TJ02 | ISTAT | U | 10.01.2024 | 09:23:20 | | 20.240.110.082.320 | EQUI | | AVLB | |
| 000000000010159518 | I0188001 | TJ02 | ISTAT | I | 10.01.2024 | 09:23:20 | | 20.240.110.082.320 | EQUI | ECUS | | |
| 000000000010159518 | I0320002 | TJ02 | ISTAT | U | 10.01.2024 | 09:20:41 | | 20.240.110.082.041 | EQUI | | INAC | |
| 000000000010159518 | I0320001 | TJ02 | ISTAT | I | 10.01.2024 | 09:20:12 | | 20.240.110.082.012 | EQUI | INAC | | |
| 000000000010159518 | I0076002 | TJ02 | ISTAT | U | 10.01.2024 | 09:18:31 | | 20.240.110.081.831 | EQUI | | DLFL | |
| 000000000010159518 | I0076001 | TJ02 | ISTAT | I | 10.01.2024 | 08:28:29 | | 20.240.110.072.829 | EQUI | DLFL | | |
| 000000000010159518 | I0099001 | TJ02 | ISTAT | I | 09.01.2024 | 15:01:10 | | 20.240.109.140.110 | EQUI | AVLB | | |

*FIG. 1*

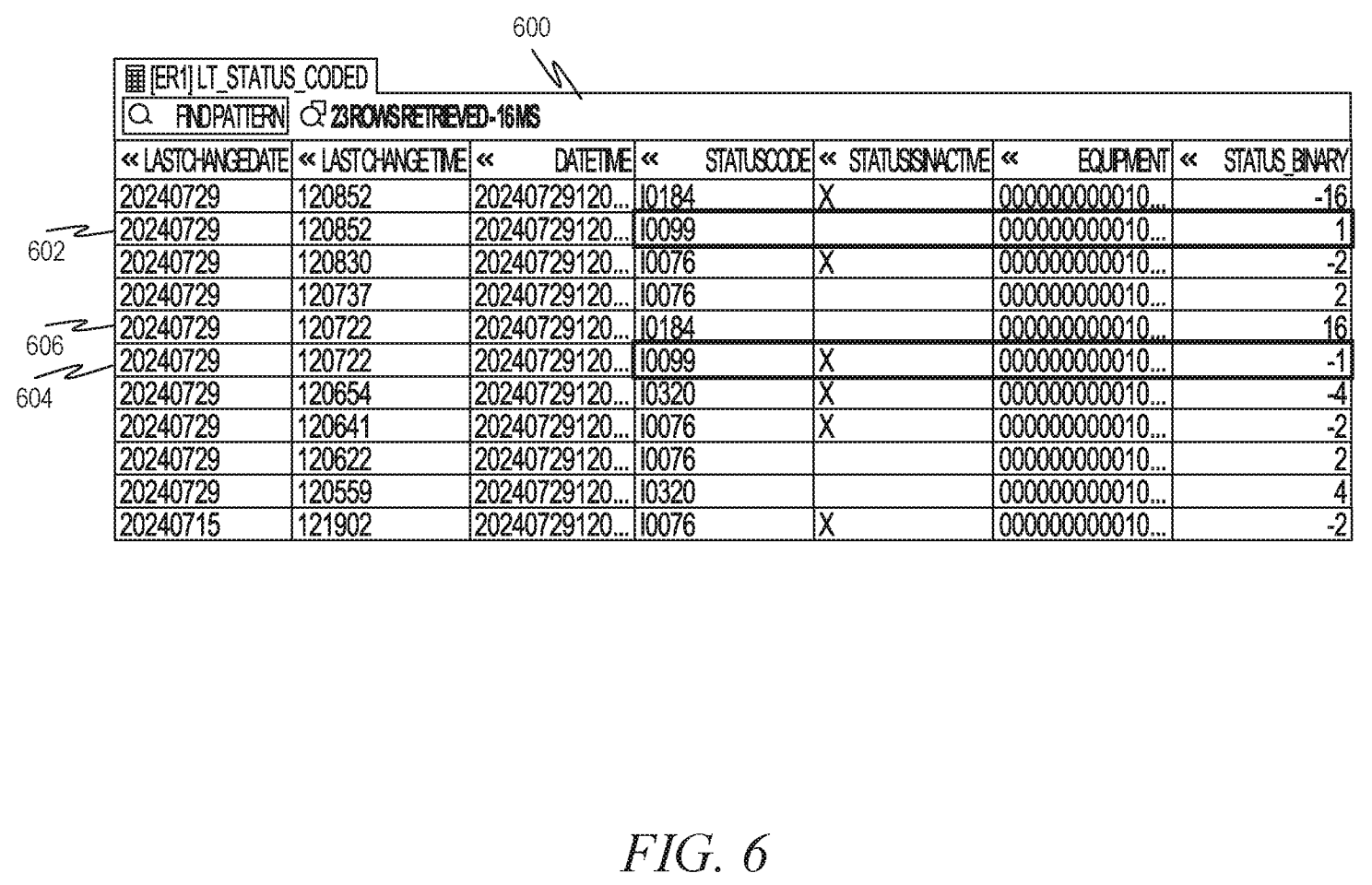

600

[ER1] LT_STATUS_CODED

FINDPATTERN 23 ROWS RETRIEVED - 16 MS

| « LASTCHANGEDATE | « LASTCHANGETIME | « DATETIME | « STATUSCODE | « STATUSISINACTIVE | « EQUIPMENT | « STATUS_BINARY |
|---|---|---|---|---|---|---|
| 20240729 | 120852 | 20240729120... | I0184 | X | 000000000010... | -16 |
| 20240729 | 120852 | 20240729120... | I0099 | | 000000000010... | 1 |
| 20240729 | 120830 | 20240729120... | I0076 | X | 000000000010... | -2 |
| 20240729 | 120737 | 20240729120... | I0076 | | 000000000010... | 2 |
| 20240729 | 120722 | 20240729120... | I0184 | | 000000000010... | 16 |
| 20240729 | 120722 | 20240729120... | I0099 | X | 000000000010... | -1 |
| 20240729 | 120654 | 20240729120... | I0320 | X | 000000000010... | -4 |
| 20240729 | 120641 | 20240729120... | I0076 | X | 000000000010... | -2 |
| 20240729 | 120622 | 20240729120... | I0076 | | 000000000010... | 2 |
| 20240729 | 120559 | 20240729120... | I0320 | | 000000000010... | 4 |
| 20240715 | 121902 | 20240729120... | I0076 | X | 000000000010... | -2 |

602 606 604

FIG. 6

| LASTCHANGEDATE | LASTCHANGETIME | DATETIME | OVERALLSTATUS BINARY | EQUIPMENT |
|---|---|---|---|---|
| 20240729 | 120852 | 20240729120... | 1 | 000000000010... |
| 20240729 | 120830 | 20240729120... | 16 | 000000000010... |
| 20240729 | 120737 | 20240729120... | 18 | 000000000010... |
| 20240729 | 120722 | 20240729120... | 16 | 000000000010... |
| 20240729 | 120654 | 20240729120... | 1 | 000000000010... |
| 20240729 | 120641 | 20240729120... | 5 | 000000000010... |
| 20240729 | 120622 | 20240729120... | 7 | 000000000010... |
| 20240729 | 120559 | 20240729120... | 5 | 000000000010... |
| 20240715 | 121902 | 20240715121... | 1 | 000000000010... |

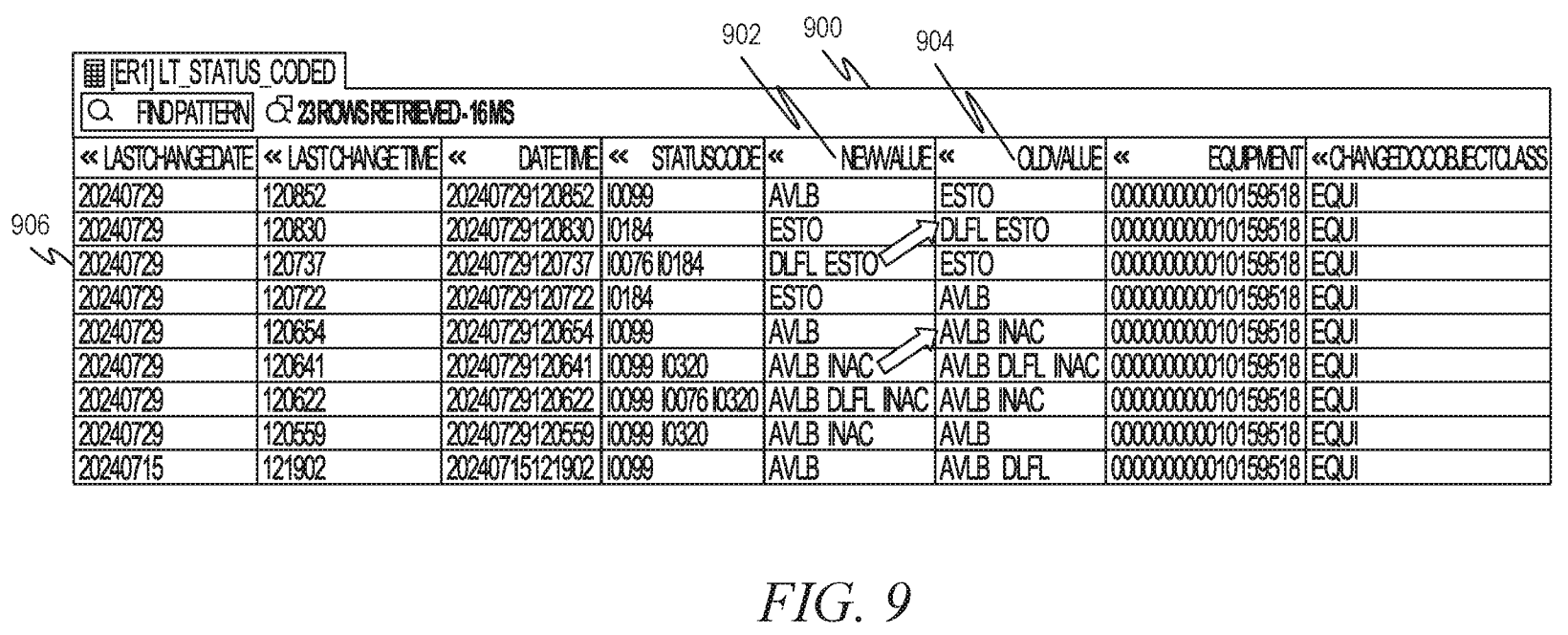

900

902

904

906

[ER1] LT_STATUS_CODED

FINDPATTERN 23 ROWS RETRIEVED - 16 MS

| « LASTCHANGEDATE | « LASTCHANGETIME | « DATETIME | « STATUSCODE | « NEWVALUE | « OLDVALUE | « EQUIPMENT | « CHANGEDOCOBJECTCLASS |
|---|---|---|---|---|---|---|---|
| 20240729 | 120852 | 20240729120852 | I0099 | AVLB | ESTO | 000000000010159518 | EQUI |
| 20240729 | 120830 | 20240729120830 | I0184 | ESTO | DLFL ESTO | 000000000010159518 | EQUI |
| 20240729 | 120737 | 20240729120737 | I0076 I0184 | DLFL ESTO | ESTO | 000000000010159518 | EQUI |
| 20240729 | 120722 | 20240729120722 | I0184 | ESTO | AVLB | 000000000010159518 | EQUI |
| 20240729 | 120654 | 20240729120654 | I0099 | AVLB | AVLB INAC | 000000000010159518 | EQUI |
| 20240729 | 120641 | 20240729120641 | I0099 I0320 | AVLB INAC | AVLB DLFL INAC | 000000000010159518 | EQUI |
| 20240729 | 120622 | 20240729120622 | I0099 I0076 I0320 | AVLB DLFL INAC | AVLB INAC | 000000000010159518 | EQUI |
| 20240729 | 120559 | 20240729120559 | I0099 I0320 | AVLB INAC | AVLB | 000000000010159518 | EQUI |
| 20240715 | 121902 | 20240715121902 | I0099 | AVLB | AVLB DLFL | 000000000010159518 | EQUI |

*FIG. 9*

ACCUMULATED STATUS IN A CHANGE LOG USING SCRIPT

TECHNICAL FIELD

This document generally relates to distributed cloud environments. More specifically, this document relates to calculating and displaying an accumulated status in a change log using a script.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than main memory access. One example of in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

FIG. 1 is a diagram illustrating a traditional status log table.

FIG. 6 is an example status log table having the assigned status binary value assigned to each row, in accordance with an example embodiment.

FIG. 9 is an example status log table with text indicators of status identifiers, in accordance with an example embodiment.

DETAILED DESCRIPTION

Figure 2:
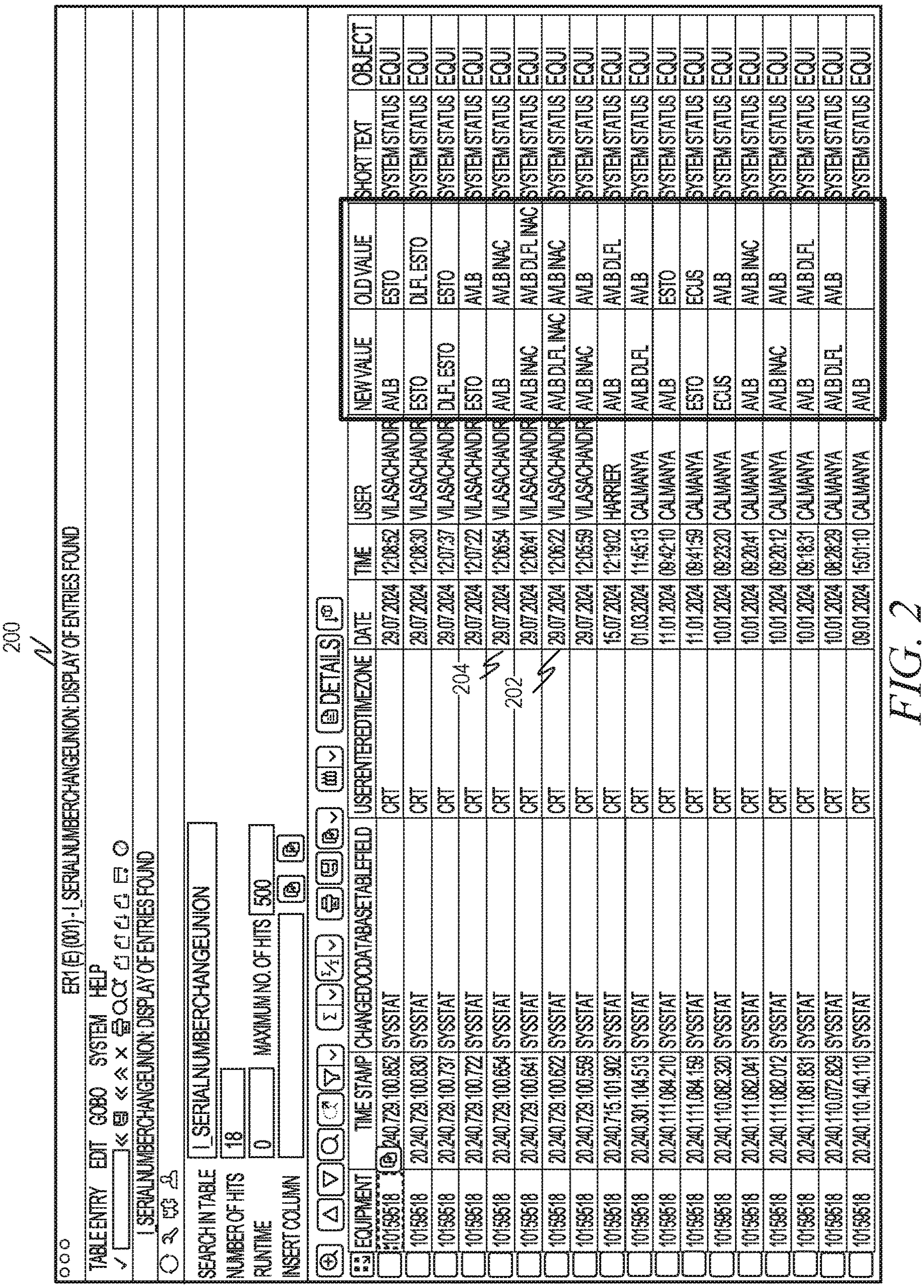
FIG. 2 is a diagram illustrating a status log table, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One implementation of in-memory databases is to place them in a cloud and allow access to the cloud database as a service. This allows customers to leverage the in-memory data processing and advanced analytic capabilities in the cloud.

One common use of in-memory databases is for businesses and other organizations to manage inventory of items, whether it be finished goods, raw materials, or components. Changes to inventory levels of these items or related changes to features of the items may be performed on the in-memory database. These changes can include changes to one or more status indicators for the items. Each of these status indicators represents a different state or condition of an item. Examples of such status indicators include Available (AVLB), Canceled (CANC), Deletion Flag (DLFL), Deleted (DLT), Documented (DOCC), Customer (ECUS), Delivered (EDEL), Stocked (ESTO), Inactive (INAC), Physical Inventory Active (PIAC), and Handling Unit Assigned (HUAS). The values for these status indicators are binary, with a "1" indicating that the corresponding status indicator applies to the item and a "0" indicating that the corresponding status indicator does not apply to the item.

Traditionally, changes to these status indicators are stored chronologically (or reverse chronologically) in a status log. Thus, each change to a status indicator is notated as separate entry in the status log. Since the status log is typically stored as a table, this means that each change to a status indicator is saved as a separate row of the table. FIG. 1 is a diagram illustrating a traditional status log table 100. Here, the status log table 100 corresponds to a single item, such as may be identified by a single serial number or other unique identifier. Each row of the status log table 100 indicates a different change to a status indicator for that item. Thus, row 102 indicates that the AVLB status indicator has been changed from off to on (e.g., 0 to 1), since the cell in the old value column is blank and the cell in the new value column is set to AVLB. Thus, at the timestamp indicated in the row 102, the item was set to available. Likewise, row 104 indicates that the ESTO status indicator has been changed from on to off (e.g., 1 to 0), since the cell in the new value column is blank and the cell in the old value column is set to ESTO. Thus, at the timestamp indicated in the row 104, the stocked status of the item was removed (indicating, for example, that the item is no longer stocked).

Using such a traditional status log table 100, however, can be technically challenging for users to understand. Specifically, it is difficult for users to understand what the overall system status is at any given point in time in the log.

In an example embodiment, a script is provided that automatically converts the active statuses at any given point in time in the status log table into a sum of binary numbers. Each status identifier is assigned to a different position of a binary number. In a binary number, each position represents a different power of 2. Here, since each status identifier is assigned to a different position, the value of the binary number can be used to indicate which status indicators are set and which are not set. Changes to a status indicator can then be set by a rise or fall in the corresponding position of the binary number. The script may then condense rows having identical timestamps and perform an inner join with the status table. Texts for the status indicators may then be added and aggregated to the status log table. The resultant status log table provides a more efficient and clear mechanism for viewing the status indicators at any particular point in time.

FIG. 2 is a diagram illustrating a status log table 200, in accordance with an example embodiment. Here, unlike the traditional status log table 100 of FIG. 1, each row displays an aggregated indication of which status indicators are set and which are not. Thus, for example, a user can easily see from row 202 that at time 12:06:22, the AVLB, DLFL, and INAC status indicators are set but from row 204 that at time 12:06:54, just the AVLB status indicator is set.

Figure 3:
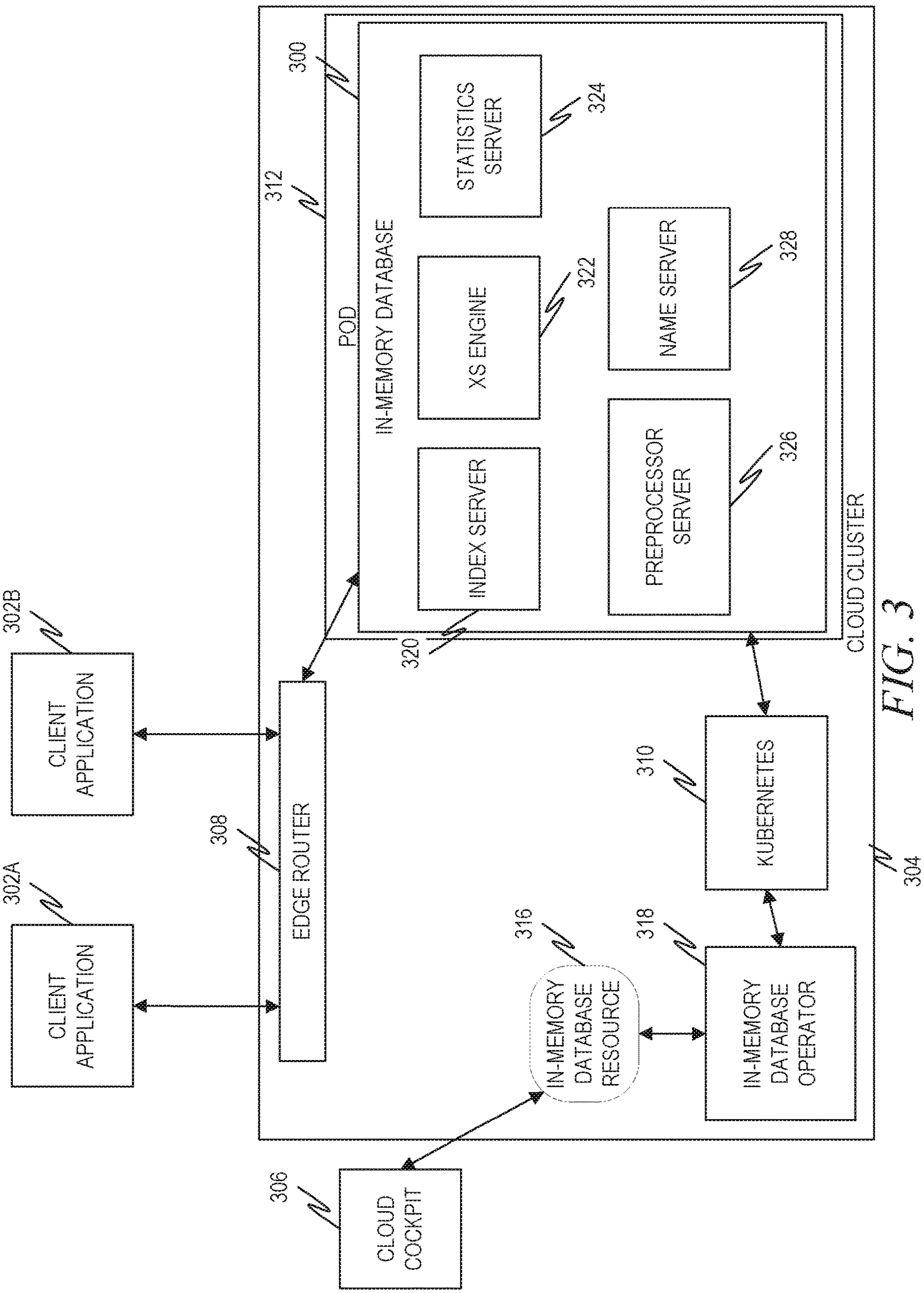
FIG. 3 is a diagram illustrating a cloud-based in-memory database, including its client/external connection points, in accordance with an example embodiment.

FIG. 3 is a diagram illustrating a cloud-based in-memory database 300, including its client/external connection points, in accordance with an example embodiment. Here, the in-memory database 300 may be coupled to one or more client applications 302A, 302B. The client applications 302A, 302B may communicate with the in-memory database 300 through a number of different protocols, including Structured Query Language (SQL), Multidimensional Expressions (MDX), Hypertext Transfer Protocol (HTTP), REST, and Hypertext Markup Language (HTML).

The in-memory database 300 may be stored in cloud cluster 304. Also depicted is a cloud cockpit 306, used to perform lifecycle operations on the in-memory database 300. The one or more client applications 302A, 302B may access the in-memory database system via an edge router 308. On the back end, however, Kubernetes 310 is used to manage the specific instance of the in-memory database, which may be stored in a Kubernetes pod 312 or another container.

An in-memory database operator 318 may receive a request from the cloud cockpit 306 to create an instance of the in-memory database 300. This request may include, or at least reference, an in-memory database resource 316 which specifies one or more requirements of the in-memory database 300. The in-memory database operator 318 may then interface with Kubernetes 310 to create the in-memory database 300 in the pod 312. More particularly, the in-memory database resource may be established by a service broker application program interface (API).

The in-memory database 300 may comprise a number of different components, including an index server 320, an XS engine 322, a statistics server 324, a preprocessor server 326, and a name server 328. These components may operate on a single computing device or may be spread among multiple computing devices (e.g., separate servers).

The index server 320 contains the actual data and the engines for processing the data. It also coordinates and uses all the other servers. The XS engine 322 allows clients to connect to the in-memory database 300 using web protocols. The statistics server 324 collects information about status, performance, and resource consumption from all the other server components. The statistics server 324 can be accessed from the cloud cockpit 306 to obtain the status of various alert monitors. The preprocessor server 326 is used for analyzing text data and extracting the information on which text search capabilities are based. The name server 328 holds information about the database topology. This is used in a distributed system with instances of the database on different hosts. The name server 328 knows where the components are running, and which data is located on which server.

Figure 4:
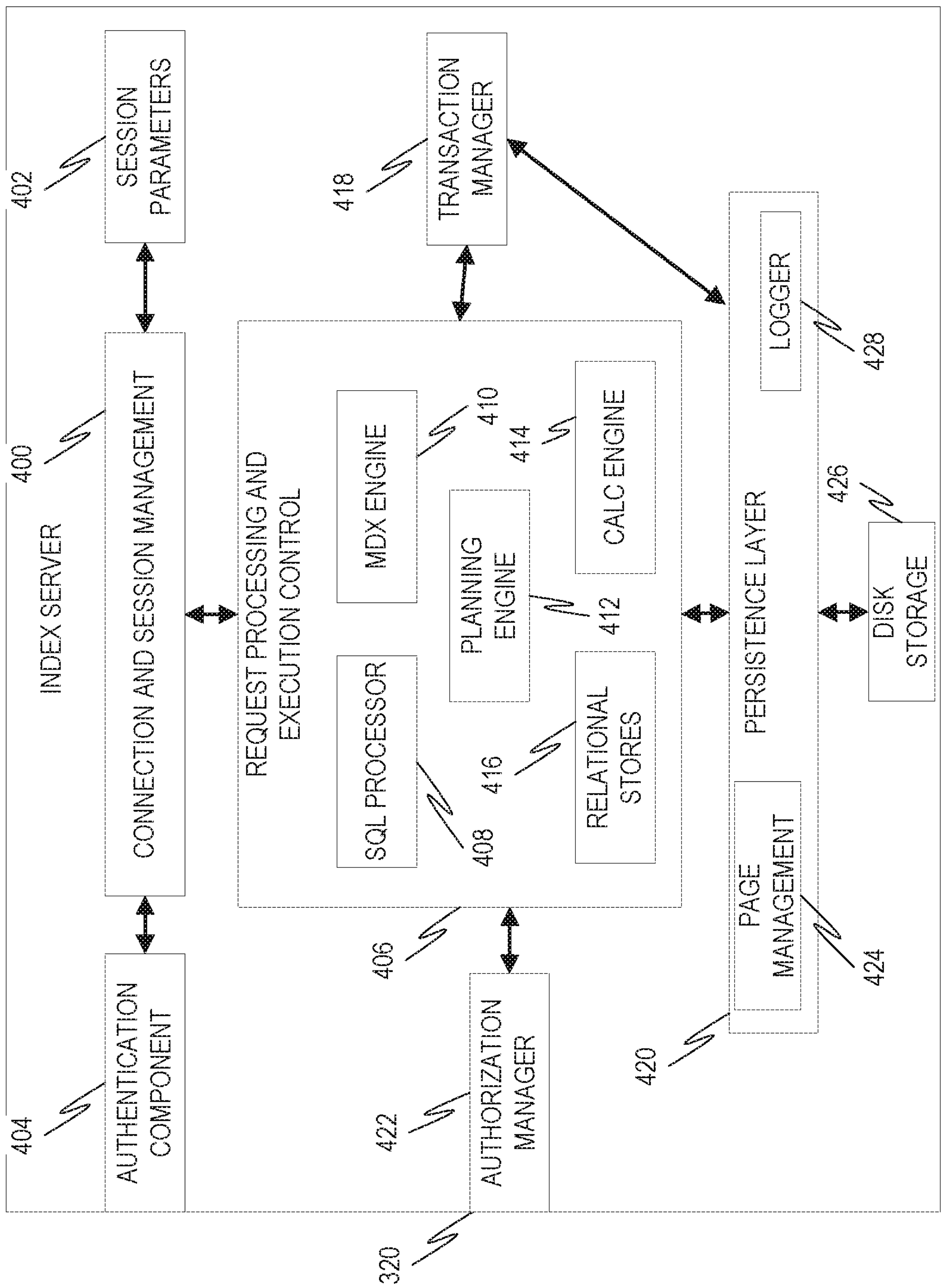
FIG. 4 is a diagram illustrating an index server, in accordance with an example embodiment.

FIG. 4 is a diagram illustrating an index server 320, in accordance with an example embodiment. Specifically, the index server 320 of FIG. 3 is depicted in more detail. The index server 320 includes a connection and session management component 400, which is responsible for creating and managing sessions and connections for the database clients. Once a session is established, clients can communicate with the database system using SQL statements. For each session, a set of session parameters 402 may be maintained, such as auto-commit, current transaction isolation level, and so forth. Users (e.g., system administrators, developers) may be authenticated by the database system itself (e.g., by logging in with username and password, using an authentication component 404), or authentication can be delegated to an external authentication provider such as a Lightweight Directory Access Protocol (LDAP) directory.

The client requests can be analyzed and executed by a set of components summarized as request processing and execution control 406. An SQL processor 408 checks the syntax and semantics of the client SQL statements and generates a logical execution plan. MDX are a language for querying and manipulating multidimensional data stored in online analytical processing (OLAP) cubes. As such, an MDX engine 410 is provided to allow for the parsing and executing of MDX commands. A planning engine 412 allows applications (e.g., financial planning applications) to execute basic planning operations in the database layer. One such operation is to create a new version of a dataset as a copy of an existing dataset, while applying filters and transformations.

A calc engine 414 implements the various SQL script and planning operations. The calc engine 414 creates a logical execution plan for calculation models derived from SQL scripts, MDX, planning, and domain-specific models. This logical execution plan may include, for example, breaking up a model into operations that can be processed in parallel.

The data is stored in relational stores 416, which implement a relational database in main memory.

Each SQL statement may be processed in the context of a transaction. New sessions are implicitly assigned to a new transaction. A transaction manager 418 coordinates database transactions, controls transactional isolation, and keeps track of running and closed transactions. When a transaction is committed or rolled back, the transaction manager 418 informs the involved engines about this event so they can execute needed actions. The transaction manager 418 also cooperates with a persistence layer 420 to achieve atomic and durable transactions.

An authorization manager 422 is invoked by other database system components to check whether the user has the specified privileges to execute the requested operations. The database system allows for the granting of privileges to users or roles. A privilege grants the right to perform a specified operation on a specified object.

The persistence layer 420 ensures that the database is restored to the most recent committed state after a restart and that transactions are either completely executed or completely undone. To achieve this goal in an efficient way, the persistence layer 420 uses a combination of write-ahead logs, shadow paging, and save points. The persistence layer 420 also offers a page management interface 424 for writing and reading data to and from a separate disk storage 426, and also contains a logger 428 that manages the transaction log. Log entries can be written implicitly by the persistence layer 420 when data is written via the persistence interface or explicitly by using a log interface.

Figure 5:
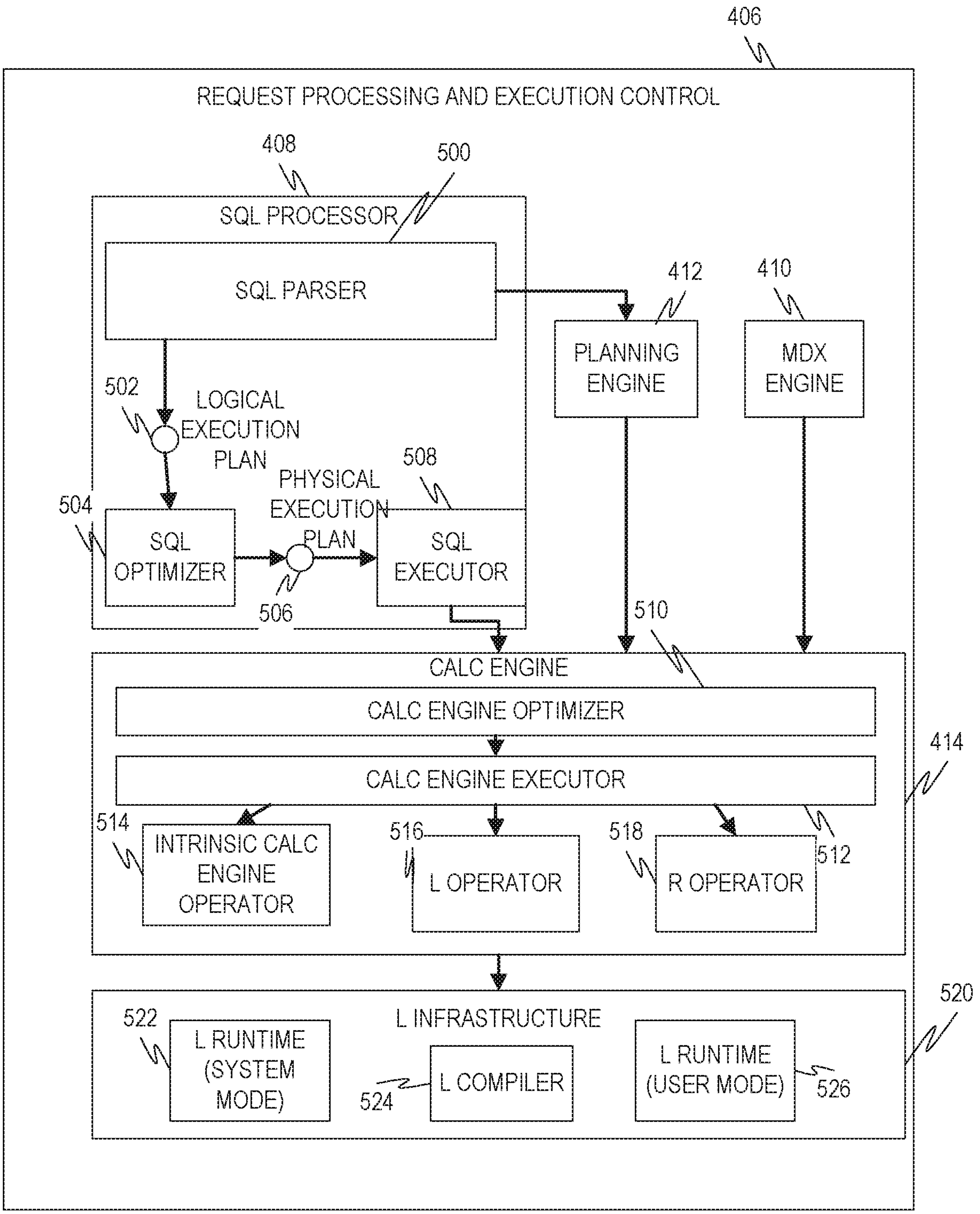
FIG. 5 is a diagram illustrating a request processing and execution control, in accordance with an example embodiment.

FIG. 5 is a diagram illustrating a request processing and execution control 406, in accordance with an example embodiment. This diagram depicts the request processing and execution control 406 of FIG. 4 in more detail. The SQL processor 408 contains an SQL parser 500, which parses an SQL statement and generates a logical execution plan 502, which it passes to an SQL optimizer 504. The SQL optimizer 504 then optimizes the logical execution plan 502 and converts it to a physical execution plan 506, which it then passes to an SQL executor 508. The calc engine 414 implements the various SQL script and planning operations, and includes a calc engine optimizer 510, which optimizes the operations, a calc engine executor 512, which executes the operations, and an intrinsic calc engine operator 514, an L operator 516, and an R operator 518.

An L infrastructure 520 includes a number of components to aid in the running of L procedures, including an L-runtime (system mode) 522, an L compiler 524, and an L-runtime (user mode) 526.

Referring back to FIG. 5, when one of the client applications (client application 302A or client application 302B) acts to request an indication of status of an item, the corresponding client application then runs a script that performs various actions and sends SQL commands to the in-memory database 300. Specifically, referring back to FIG. 5, the SQL processor 408 receives these SQL commands and processes them.

In an example embodiment, the script allows for dynamic construction of the binary number that can be used to track and view aggregated status information for an item. The dynamic nature of this script provides significant flexibility to handle many different numbers and types of status identifiers, even handling cases where new status identifiers are added (or existing status identifiers removed).

More particularly, in a robust item ecosystem, different items may have different combinations of relevant status identifiers. For example, the stocked status identifier (ESTO) might only be relevant for items that can be stocked, and thus any non-stockable item might not even have this identifier available to be set. The script described in the present disclosure is able to dynamically handle whatever combination of status identifiers can be applied to a particular item.

More specifically, the script begins by determining what the status identifiers are for a particular item. Note this means determining which status identifiers have been defined for use with a particular item—not necessarily that these status identifiers have been set to "1". Thus, a particular item may have five status identifiers (e.g., PIAC, ESTO, EDEL, HUAS, AVLB), but any of these status identifiers may be set to 0 or 1 at any time. Note that this means that the particular item may not have other status identifiers that other items may have (e.g., DOCC).

In order to determine the status identifiers for an item, the script issues a SQL command to perform an inner join of the status log table and an equipment view. The equipment view may uniquely identify one or more ways to identify the item (such as an equipment identification, or a serial number, or a stock keeping number (sku) number, etc.). The inner join causes all rows of the status log table that contain one of those means of identifying the item to be extracted. These extracted rows are then examined to extract out all the unique status identifiers mentioned in the extracted rows. Thus, for example, if just the five status identifiers, e.g., PIAC, ESTO, EDEL, HUAS, AVLB are mentioned in these extracted rows, then those five status identifiers are now considered to be valid status identifiers for the item.

Then a different integer identification is assigned to each of the valid status identifiers, beginning with the number "1" and increasing each subsequent integer identification by 1. Thus, for example, PIAC may be assigned "1", ESTO may be assigned "2", EDEL may be assigned "3", HUAS may be assigned "4", and AVLB may be assigned "5".

Each valid status identifier may then also be assigned a different position in a binary number, based on its corresponding integer identification. Thus, for example, PIAC may be assigned the first position, ESTO may be assigned the second position, etc. Since this is a binary number, the value of a particular position is based on the formula: $value=2^{position-1}$. Thus, the value of the first position is 1, the value of the second position is 2, the value of the third position is 4, the value of the fourth position is 8, and the value of the fifth position is 16, and so on. This value may be called the position value for the corresponding status identifier.

The status log table is then traversed and for each row in which a status identifier was set (e.g., changed to 1), the corresponding position value for that status is assigned as a positive number, while for each row in which the status identifier was unset (e.g., changed to 0), the corresponding position value for the status is assigned as a negative number. Thus, for example, if the position value of a HUAS status identifier is 8, then if the row in the status log table shows that HUAS was set, then a +8 is assigned to that row, while if the row in the status log table shows that HUAS was unset, then a −8 is assigned to that row.

FIG. 6 is an example status log table 600 having the assigned status binary value assigned to each row, in accordance with an example embodiment. Here, for example, row 602 shows that PIAC was set, resulting in a +1 in the corresponding assigned status binary value, while row 604 shows that PIAC was unset, resulting in a −1 in the corresponding assigned status binary value. Notably, certain rows have identical timestamps, such as row 606 and row 604.

Figure 7:
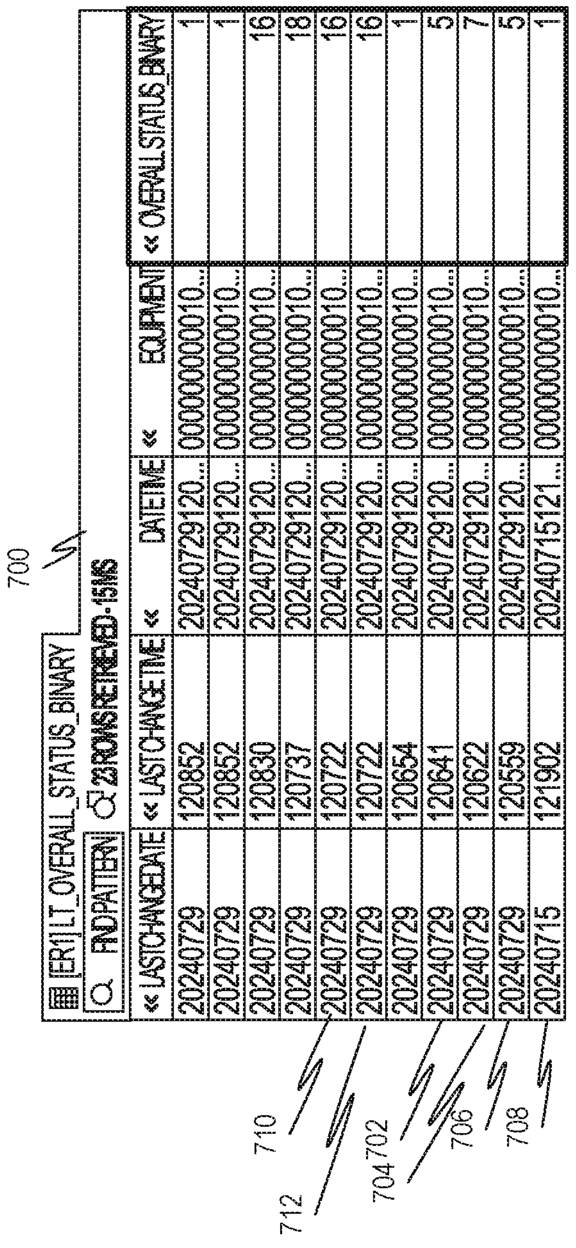
FIG. 7 is an example status log table with summed status binary values, in accordance with an example embodiment.

Then, for each row, all of the chronologically previous rows' assigned status binary values are summed. The resultant sum for each row shows which status identifiers have been set or not at the corresponding timestamp. FIG. 7 is an example status log table 700 with summed status binary values, in accordance with an example embodiment. Here, for example, the value for the summed status binary values for row 702 is the sum of all the earlier timestamped rows' status binary values, including those for row 704, row 706, and row 708, which, referring to FIG. 6 were −2, 4, and +2, respectively, thus the sum is 4. At a conceptual level, the binary number 4 is expressed as 00100, which means that the third position is set and the other positions are not set, which in this case indicates that the EDEL status identifier was set.

Figure 8:
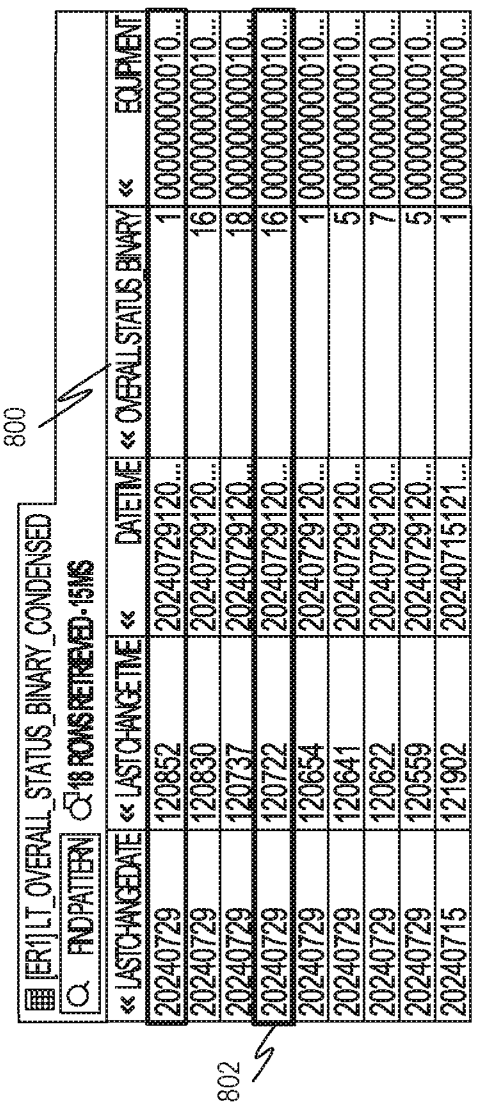
FIG. 8 is an example status log table having condensed rows showing the assigned status binary value assigned to each row, in accordance with an example embodiment.

Then, the rows having identical timestamps are combined into single rows, keeping their corresponding assigned binary values. FIG. 8 is an example status log table 800 having condensed rows showing the assigned status binary value assigned to each row, in accordance with an example embodiment. Here, for example, rows 710 and 712 of FIG. 7 have been condensed into row 802.

Thus, at a conceptual level, by looking at the example status log table 800 of FIG. 8, one can determine that at the timestamp for row 802, only the HUAS status identifier was set.

At the practical level, however, there still exists a need to make this information clear to the user in a format that is easily digestible, and to have the status log table be able to be used for future changes and user requests for statuses. As such, another version of the status log table may be generated that includes, for each row, the corresponding assigned status binary value, the corresponding summed assigned status binary values, and a text indication of the status identifier.

FIG. 9 is an example status log table 900 with text indicators of status identifiers, in accordance with an example embodiment. Here, as can be seen, a new value column 902 has been added and an old value column 904 has been added. The values in the new value column 902 indicate, for any given timestamp (row), what the set status indicators are. The values in the old value column 904 indicate, for any given timestamp (row), what the previous set status indicators were. Thus, at any given row, the value(s) in the old value column 904 matches the value(s) in the new value column 902 of the row just below it (representing the immediately chronologically older timestamp).

In this manner, a user viewing row 906 would be able to immediately determine that, at the corresponding timestamp, the ESTO status indicator is set, while immediately prior to this, both the ESTO and the DLFL indicators were set.

It should be noted that at a scripting level it may not be possible in all implementations to go directly from the status log table 800 of FIG. 8 to the status log table 900 of FIG. 9. Specifically, in languages like SQL, operations are conducted mainly via join operations. Thus, there potentially would need to be several joins to be performed per line, thus necessitating the extraction of binary numbers of a timestamp into distinct entries prior to performing a join per binary number (status) and then reaggregating these.

Implementations are also possible where SQL window functions like lead and sum are utilized.

Figure 10:
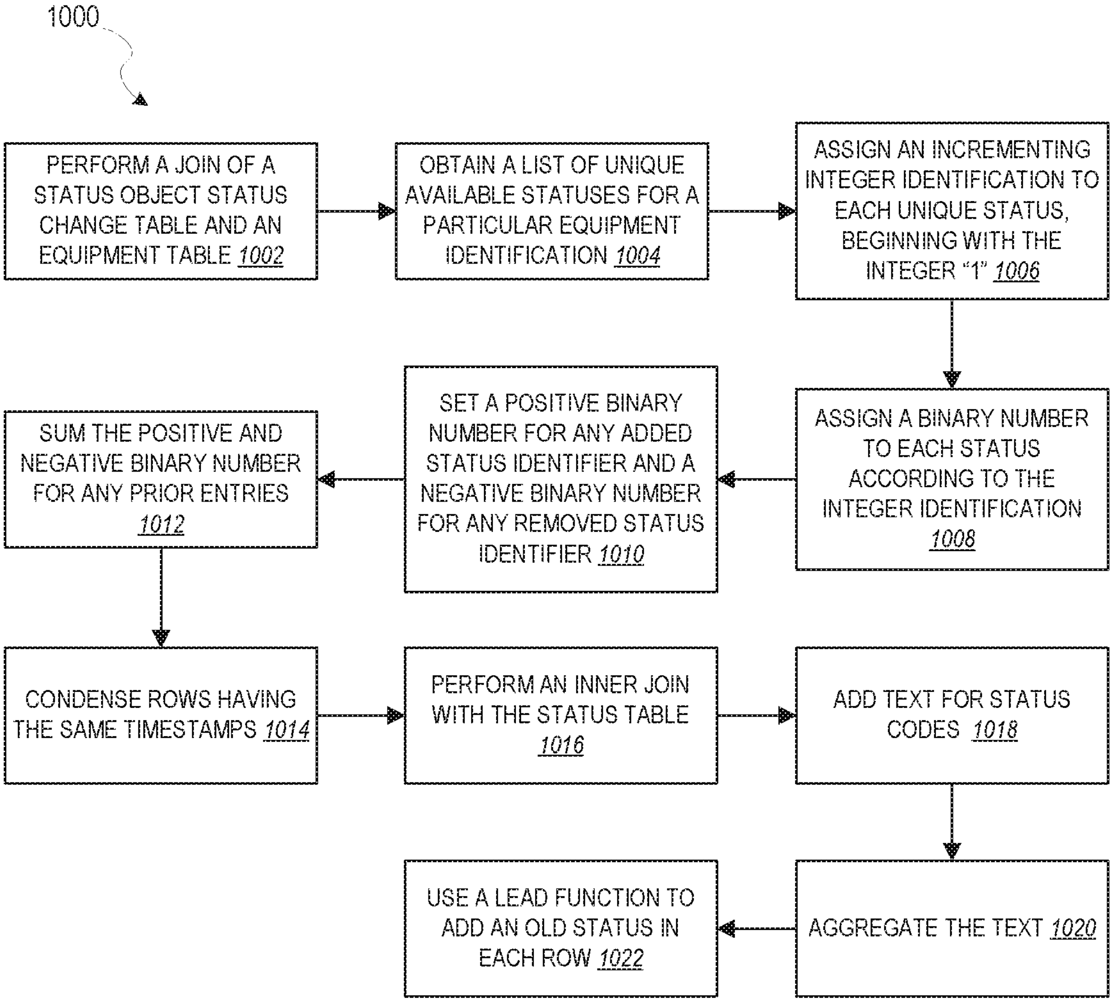
FIG. 10 is a flow diagram illustrating a method for performing a SQL script, in accordance with an example embodiment.

FIG. 10 is a flow diagram illustrating a method 1000 for performing a SQL script, in accordance with an example embodiment. At operation 1002, a join of a status object status change table and an equipment table is performed. This may be implemented using the following SQL script:

```
*select status changes only for equipment
  lt_equipment_status_changes=select
    sc.mandt,
    e.Equipment,
    sc.LastChangeDate,
    sc.LastChange Time,
    sc.StatusObject,
    concat(sc.LastChangeDate, sc.LastChangeTime) as
      datetime,
    sc.LastChangedByUser,
    sc.StatusCode,
    sc.StatusIsInactive
    from I_StatusObjectChange as sc
    inner join I_Equipment as e
      on e.MaintObjectInternalID=sc.StatusObject
      and e.Equipment=: iv_equipment
      and e.mandt=sc.mandt
    where sc.mandt=: iv mandt;
```

This gets changes relevant for a given equipment identification. At operation 1004, a list of unique available statuses for a particular equipment identification is obtained. This may be implemented using the following SQL script:

```
* get list of unique available statuses for equipment
  lt_unique_status=select
    distinct StatusCode
    from:lt_equipment_status_changes;
```

The result may be a unique statuses table that includes status codes for each unique status identifier.

At operation 1006, an incrementing integer identification is assigned to each unique status, beginning with the integer "1". This may be implemented using the following SQL script:

```
* assign an id to each status
  lt_unique_status_id=select
    StatusCode,
    row_number ( ) over ( ) as row_id
    from:lt_unique_status;
```

At operation 1008, a binary number may be assigned to each status according to the integer identification. This may be implemented with the following SQL script:

```
* according to the id: assign a binary number to each
  status
  lt_unique_status_binary=select
    StatusCode,
    row_id,
    power (2, row_id−1) as status_binary
    from:lt_unique_status_id;
```

At operation 1010, a positive binary number may be set for any added status identifier and a negative binary number may be set for any removed status identifier. This may be implemented with the following SQL script:

```
* convert setting of status by change document into binary numbers
  lt_status_coded = SELECT
    s.mandt,
    s.Equipment,
    s.LastChangeDate,
    s.LastChangeTime,
    concat( s.LastChangeDate, s.LastChangeTime ) as datetime,
    s.LastChangedByUser,
    s.StatusCode,
    StatusIsInactive,
    case
      when StatusIsInactive = ' '
        then status_binary
      when StatusIsInactive = 'X'
        then -status_binary
      else 0
    end as status_binary
    from :lt_equipment_status_changes as s
    inner join :lt_unique_status_binary as b
      on s.StatusCode = b.StatusCode
    order by datetime desc;
```

At operation 1012, the positive and negative binary number for any prior entries may be summed. This may be implemented with the following SQL script:

```
* sum over binary status until a certain datetime
  lt_overall_status_binary=select
    mandt,
    Equipment,
    LastChangeDate,
    LastChange Time,
    datetime,
    LastChangedByUser,
    sum(status_binary) over (partition by equipment
      order by datetime) as overall_status_binary
    from:lt_status_coded
    order by datetime desc;
```

At operation 1014, rows having the same timestamps (assuming they were created by the same user, which helps ensure that they were all made in a single operation) may be condensed. This may be implemented with the following SQL script:

```
* condense same times for equipment changed by one
  user at a certain time
  lt_overall_status_binary_condensed=SELECT
```

```
MAX(mandt) AS mandt,
Equipment,
max(LastChangeDate) as LastChangeDate,
max(LastChangeDate) as LastChangeTime,
datetime,
LastChangedByUser,
max(overall_status_binary) as overall_status_binary
from:lt_overall_status_binary
group by datetime, LastChangedByUser, Equipment
order by datetime desc;
```

At operation 1016, an inner join may be performed with the status table when $$\frac{\text{overall\_status\_binary } \% \, (2 \cdot \text{status\_binary})}{\text{status\_binary}} \geq 1.$$

This may be implemented with the following SQL script:

```
* inner join with status table where overall status contains binary number
    for that status
  lt_overall_status_binary_join = SELECT
    mandt,
    Equipment,
    LastChangeDate,
    LastChangeTime,
    datetime,
    LastChangedByUser,
    b.status_binary as status_binary,
    overall_status_binary,
    StatusCode
    from :lt_overall_status_binary_condensed as snap
      inner join :lt_unique_status_binary as b ON 1 = 1
      where mod( overall_status_binary, 2*status_binary) / status_binary
        >=1;
```

At operation 1018, text for status codes may be added. This may be implemented with the following SQL script:

```
* add texts for status code
  lt_overall_status_text=SELECT
    mandt,
    Equipment,
    LastChangeDate,
    LastChange Time,
    datetime,
    LastChangedByUser,
    status_binary,
    StatusCode,
    SystemStatusShortName,
    SystemStatusName
  from: lt_overall_status_binary_join as osb
  inner join I_SystemStatusText as txt
    on osb.StatusCode=txt.SystemStatus
    where txt.Language=session_context ('LOCALE_SAP');
```

At operation 1020, the texts may be aggregated. This may be implemented with the following SQL script:

```
* aggregate status for same timestamp and equipment
  lt_overall_status_agg=SELECT
    MAX(mandt) AS mandt,
    MAX(Equipment) as Equipment,
    MAX(LastChangeDate) AS LastChangeDate,
    MAX(LastChangeTime) AS LastChange Time,
    datetime,
    LastChangedByUser,
    STRING_AGG(StatusCode, ' ') as StatusCodeAgg,
    STRING_AGG(SystemStasuShortName, ' ') as StatusTextAgg
    FROM:lt_overall_status_text
    GROUP BY datetime, LastChangedByUser;
```

At operation 1022, a lead function may be used to add an old status in each row. This may be implemented with the following SQL script:

```
* add old status aggregation by using lead function
  lt_overall_status_old_new = SELECT
    mandt,
    Equipment,
    LastChangeDate,
    LastChange Time,
    datetime,
    LastChangedByUser,
    StatusCodeAgg,
    StatusTextAgg AS New Value,
    LEAD(StatusTextAgg) OVER (PARTITION BY equipment order by
      datetime desc) AS OldValue,
    'EQUI' as ChangeDocObjectClass
  FROM :lt_overall_status_agg
    ORDER BY datetime desc;
```

The result is a table with readable text at each row indicating the current set status identifiers as well as the set status identifiers from the immediately preceding timestamp.

Figure 11:
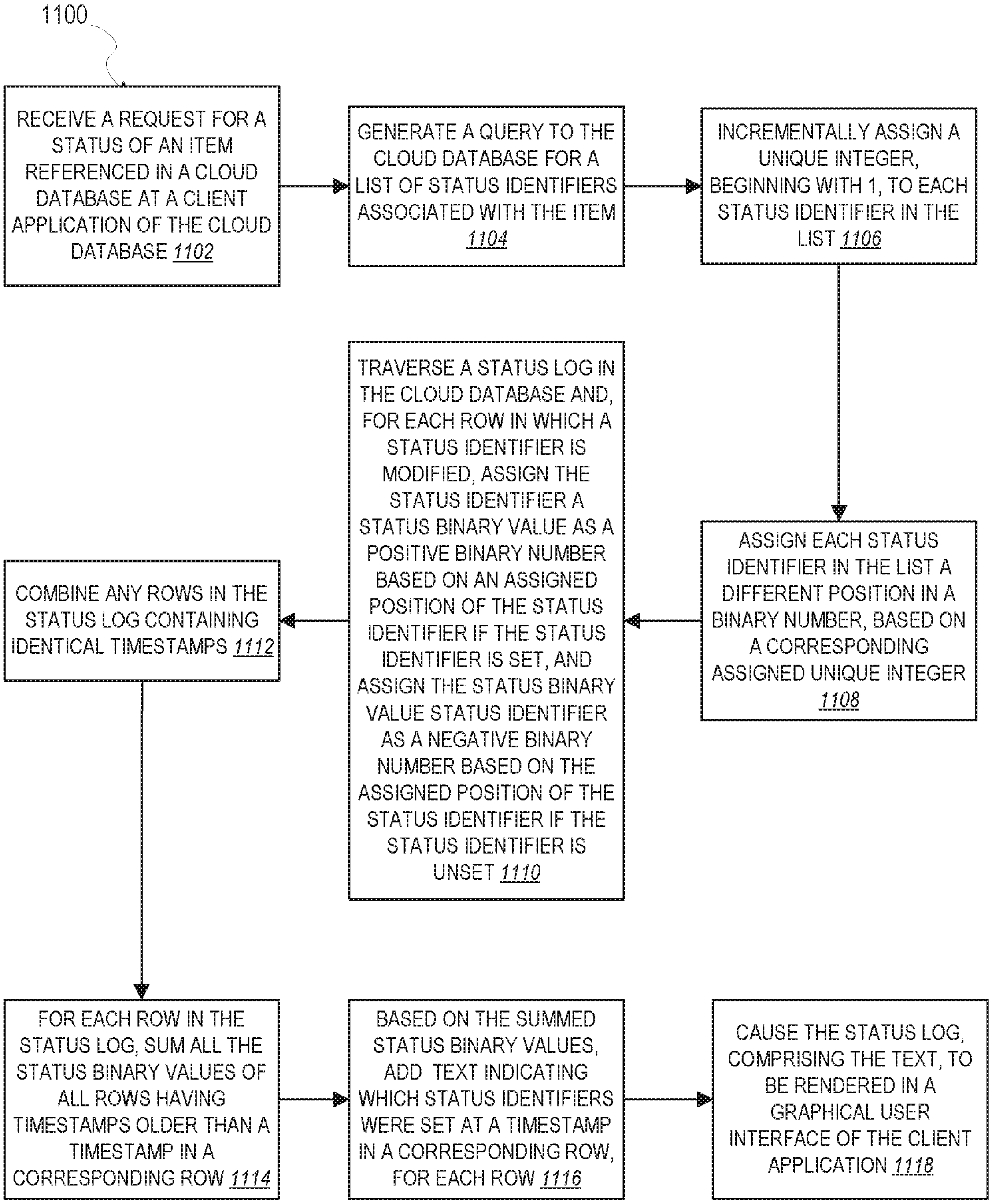
FIG. 11 is a flow diagram illustrating a method for rendering a status log in a client application of a cloud database, in accordance with an example embodiment.

FIG. 11 is a flow diagram illustrating a method 1100 for rendering a status log in a client application of a cloud database, in accordance with an example embodiment.

At operation 1102, a request for a status of an item referenced in a cloud database is received at a client application of the cloud database. At operation 1104, a query is generated to the cloud database for a list of status identifiers associated with the item.

At operation 1106, a unique integer, beginning with 1, is incrementally assigned to each status identifier in the list. At operation 1108, each status identifier in the list is assigned a different position in a binary number, based on a corresponding assigned unique integer.

At operation 1110, a status log in the cloud database is traversed and, for each row in which a status identifier is modified, assigning the status identifier a status binary value as a positive binary number based on an assigned position of the status identifier if the status identifier is set, and assigning the status binary value status identifier as a negative binary number based on the assigned position of the status identifier if the status identifier is unset.

At operation 1112, any rows in the status log containing identical timestamps are combined. At operation 1114, for each row in the status log, all the status binary values of all rows having timestamps older than a timestamp in a corresponding row are summed. At operation 1116, based on the summed status binary values, text indicating which status identifiers were set at a timestamp in a corresponding row are added for each row.

At operation 1118, the status log, comprising the text, is caused to be rendered in a graphical user interface of the client application.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1 is a system comprising: at least one hardware processor; and a computer-readable medium storing instructions that, when executed by the at least one hardware processor, cause the at least one hardware processor to perform comprising: receiving, at a client application of a cloud database, a request for a status of an item referenced in the cloud database; in response to the receiving, generating a query to the cloud database for a list of status identifiers associated with the item; incrementally assigning each status identifier in the list a unique integer, beginning with 1; assigning each status identifier in the list a different position in a binary number, based on a corresponding assigned unique integer; traversing a status log in the cloud database and, for each row in which a status identifier is modified, assigning the status identifier a status binary value as a positive binary number based on an assigned position of the status identifier if the status identifier is set, an assigning the status binary value status identifier as a negative binary number based on the assigned position of the status identifier if the status identifier is unset; combining any rows in the status log containing identical timestamps; for each row in the status log, summing all the status binary values of all rows having timestamps older than a timestamp in a corresponding row; based on the summed status binary values, adding, for each row in the status log, text indicating which status identifiers were set at a timestamp in a corresponding row; and causing the status log, comprising the text, to be rendered in a graphical user interface of the client application.

In Example 2, the subject matter of Example 1 comprises, wherein the cloud database is an in-memory database.

In Example 3, the subject matter of Examples 1-2 comprises, wherein the item is identified in the cloud database by a unique serial number.

In Example 4, the subject matter of Examples 1-3 comprises, wherein the generating the query to the cloud database for a list of status identifiers associated with the item comprises requesting a list of all distinct status codes from a table of status changes for items.

In Example 5, the subject matter of Examples 1~4 comprises, wherein the generating, incrementally assigning, assigning, traversing, combining, summing, and adding are performed by a structured query language (SQL) script.

In Example 6, the subject matter of Example 5 comprises, wherein the SQL script is executed by a SQL processor of the cloud database.

In Example 7, the subject matter of Example 6 comprises, wherein the adding comprises using a lead function.

Example 8 is a method comprising: receiving, at a client application of a cloud database, a request for a status of an item referenced in the cloud database; in response to the receiving, generating a query to the cloud database for a list of status identifiers associated with the item; incrementally assigning each status identifier in the list a unique integer, beginning with 1; assigning each status identifier in the list a different position in a binary number, based on a corresponding assigned unique integer; traversing a status log in the cloud database and, for each row in which a status identifier is modified, assigning the status identifier a status binary value as a positive binary number based on an assigned position of the status identifier if the status identifier is set, an assigning the status binary value status identifier as a negative binary number based on the assigned position of the status identifier if the status identifier is unset; combining any rows in the status log containing identical timestamps; for each row in the status log, summing all the status binary values of all rows having timestamps older than a timestamp in a corresponding row; based on the summed status binary values, adding, for each row in the status log, text indicating which status identifiers were set at a timestamp in a corresponding row; and causing the status log, comprising the text, to be rendered in a graphical user interface of the client application.

In Example 9, the subject matter of Example 8 comprises, wherein the cloud database is an in-memory database.

In Example 10, the subject matter of Examples 8-9 comprises, wherein the item is identified in the cloud database by a unique serial number.

In Example 11, the subject matter of Examples 8-10 comprises, wherein the generating the query to the cloud database for a list of status identifiers associated with the item comprises requesting a list of all distinct status codes from a table of status changes for items.

In Example 12, the subject matter of Examples 8-11 comprises, wherein the generating, incrementally assigning, assigning, traversing, combining, summing, and adding are performed by a structured query language (SQL) script.

In Example 13, the subject matter of Example 12 comprises, wherein the SQL script is executed by a SQL processor of the cloud database.

In Example 14, the subject matter of Example 13 comprises, wherein the adding comprises using a lead function.

Example 15 is a non-transitory machine-readable medium storing instructions which, when executed by one or more processors, cause the one or more processors to perform operations comprising: receiving, at a client application of a cloud database, a request for a status of an item referenced in the cloud database; in response to the receiving, generating a query to the cloud database for a list of status identifiers associated with the item; incrementally assigning each status identifier in the list a unique integer, beginning with 1; assigning each status identifier in the list a different position in a binary number, based on a corresponding assigned unique integer; traversing a status log in the cloud database and, for each row in which a status identifier is modified, assigning the status identifier a status binary value as a positive binary number based on an assigned position of the status identifier if the status identifier is set, an assigning the status binary value status identifier as a negative binary number based on the assigned position of the status identifier if the status identifier is unset; combining any rows in the status log containing identical timestamps; for each row in the status log, summing all the status binary values of all rows having timestamps older than a timestamp in a corresponding row; based on the summed status binary values, adding, for each row in the status log, text indicating which status identifiers were set at a timestamp in a corresponding row; and causing the status log, comprising the text, to be rendered in a graphical user interface of the client application.

In Example 16, the subject matter of Example 15 comprises, wherein the cloud database is an in-memory database.

In Example 17, the subject matter of Examples 15-16 comprises, wherein the item is identified in the cloud database by a unique serial number.

In Example 18, the subject matter of Examples 15-17 comprises, wherein the generating the query to the cloud database for a list of status identifiers associated with the item comprises requesting a list of all distinct status codes from a table of status changes for items.

In Example 19, the subject matter of Examples 15-18 comprises, wherein the generating, incrementally assigning, assigning, traversing, combining, summing, and adding are performed by a structured query language (SQL) script.

In Example 20, the subject matter of Example 19 comprises, wherein the SQL script is executed by a SQL processor of the cloud database.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 12:
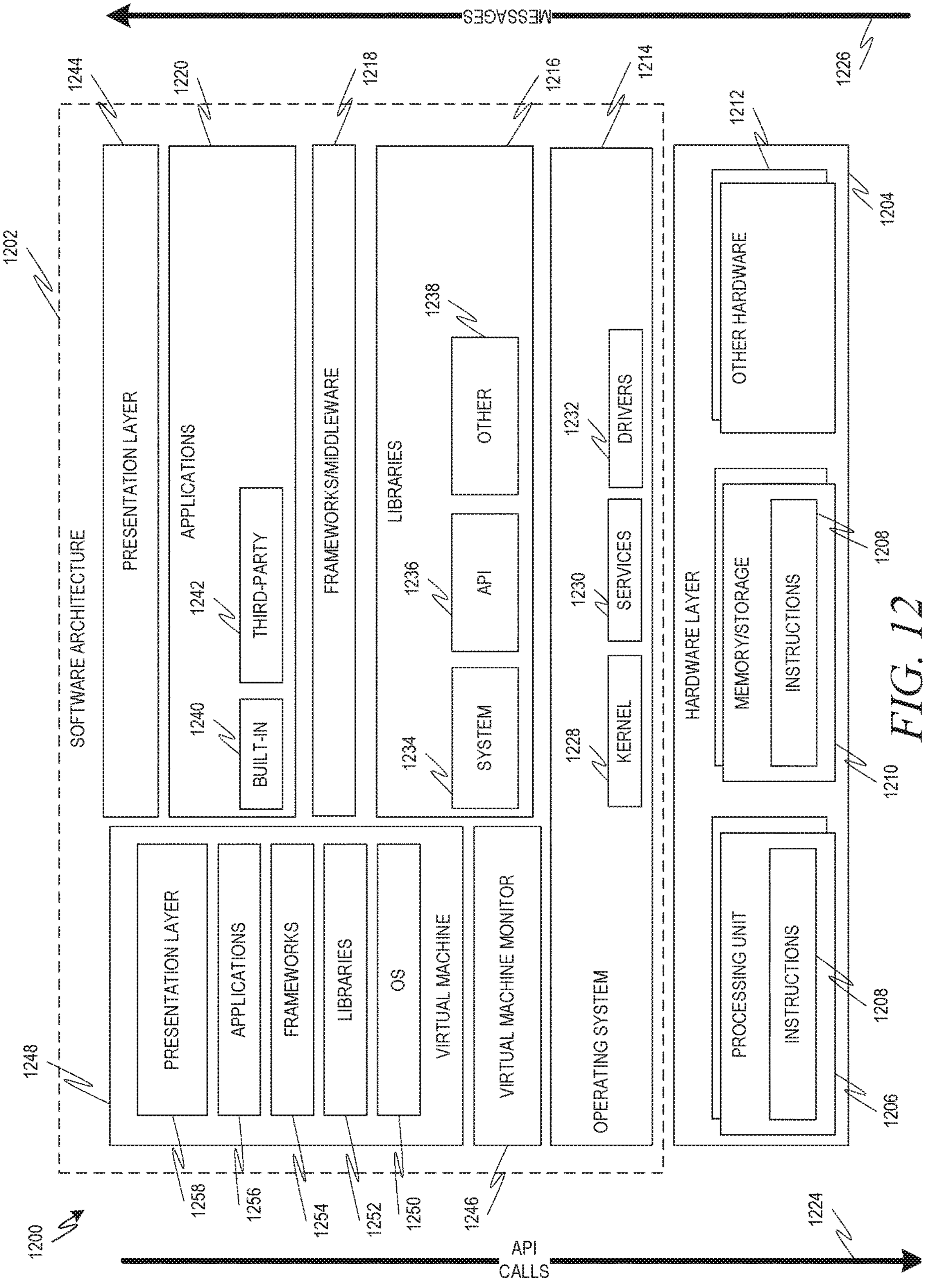
FIG. 12 shows a block diagram showing one example of a software architecture for a computing device.

FIG. 12 shows a block diagram 1200 showing one example of a software architecture 1202 for a computing device. The software architecture 1202 may be used in conjunction with various hardware architectures, for example, as described herein. FIG. 12 is merely a non-limiting example of a software architecture, and many other architectures may be implemented to facilitate the functionality described herein. A representative hardware layer 1204 is illustrated and can represent, for example, any of the above referenced computing devices. In some examples, the hardware layer 1204 may be implemented according to the architecture of the computer system of FIG. 12.

The representative hardware layer 1204 comprises one or more processing units 1206 having associated executable instructions 1208. Executable instructions 1208 represent the executable instructions of the software architecture 1202, including implementation of the methods, modules, subsystems, and components, and so forth described herein and may also include memory and/or storage modules 1210, which also have executable instructions 1208. Hardware layer 1204 may also comprise other hardware 1212 which represents any other hardware of the hardware layer 1204. Examples of the other hardware 1212 include the hardware components shown in FIG. 13.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and presentation layer 1244. Operationally, the applications 1220 and/or other components within the layers may invoke API calls 1224 through the software stack and access a response, returned values, and so forth illustrated as messages 1226 in response to the API calls 1224. The layers illustrated are representative in nature and not all software architectures have all layers. For example, some mobile or special purpose operating systems may not provide a frameworks/middleware 1218 layer, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of an interrupt and, in response, cause the software architecture 1202 to pause its current processing and execute an interrupt service routine (ISR) when an interrupt is accessed.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware 1218 may provide a higher-level common infrastructure that may be utilized by the applications 1220 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system libraries 1234, API libraries 1236, and other libraries 1238), and frameworks/middleware 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware computing device. A virtual machine is hosted by a host operating system (operating system 1214) and typically, although not always, has a virtual machine monitor 1246, which manages the operation of the virtual machine 1248 as well as the interface with the host operating system (i.e., operating system 1214). A software architecture executes within the virtual machine 1248 such as an operating system 1250, libraries 1252, frameworks/middleware 1254, applications 1256 and/or presentation layer 1258. These layers of software architecture executing within the virtual machine 1248 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 13:
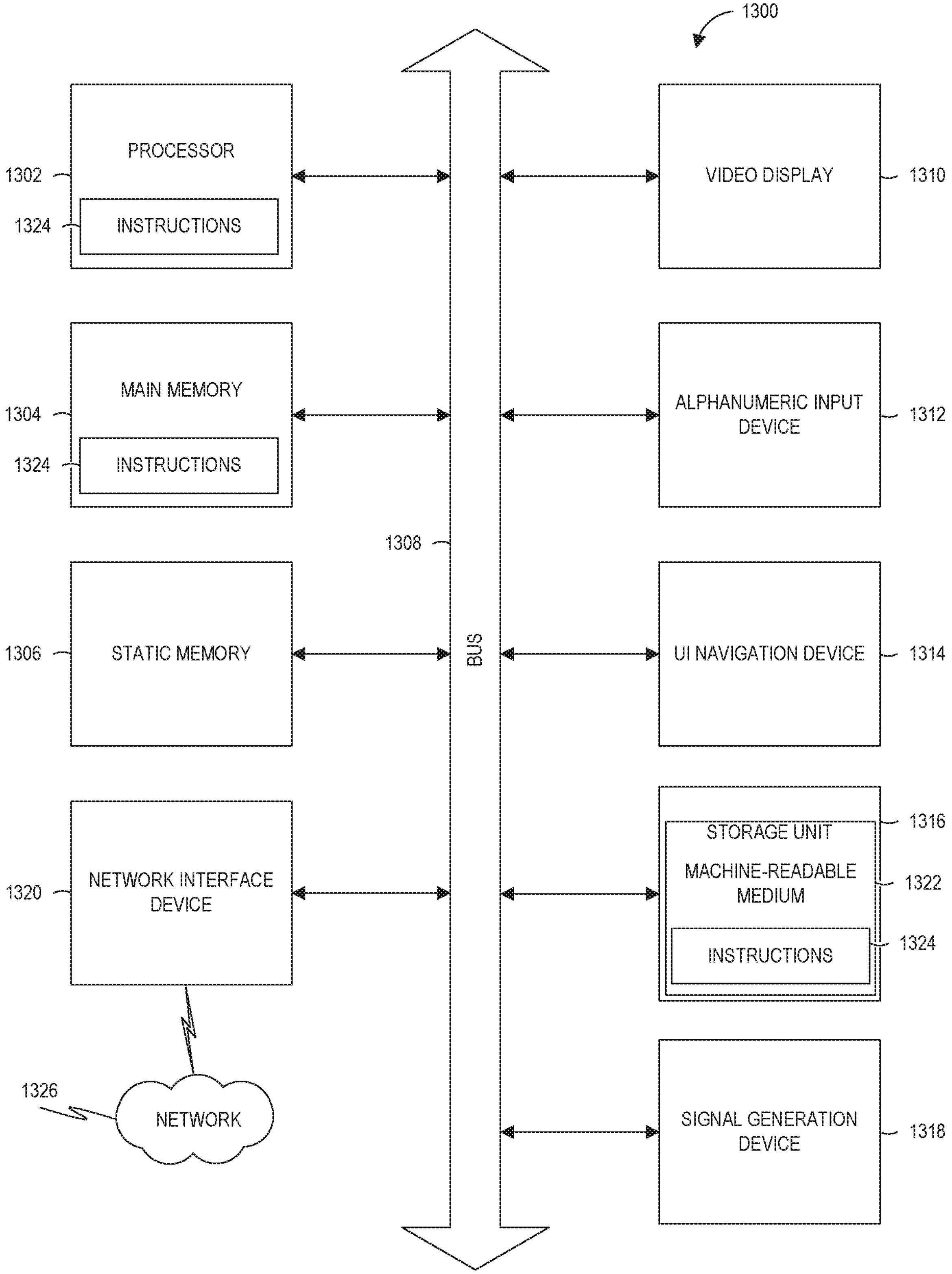
FIG. 13 shows a block diagram of a machine in the example form of a computer system within which instructions may be executed for causing the machine to perform any one or more of the methodologies discussed herein.

FIG. 13 shows a block diagram of a machine in the example form of a computer system 1300 within which instructions 1324 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube [CRT]). The computer system 1300 also includes an alphanumeric input device 1312 (e.g., a keyboard or a touch-sensitive display screen), a user interface (UI) navigation (or cursor control) device 1314 (e.g., a mouse), a storage unit 1316, a signal generation device 1318 (e.g., a speaker), and a network interface device 1320.

Machine-Readable Medium

The storage unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, with the main memory 1304 and the processor 1302 also constituting a machine-readable medium 1322.

While the machine-readable medium 1322 is shown in FIG. 13 to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with the instructions 1324. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1324 may further be transmitted or received over a communications network 1326 using a transmission medium. The instructions 1324 may be transmitted using the network interface device 1320 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1324 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:

at least one hardware processor; and a computer-readable medium storing instructions that, when executed by the at least one hardware processor, cause the at least one hardware processor to perform operations comprising:

receiving, at a client application of a cloud database, a request for a status of an item referenced in the cloud database;

in response to the receiving, generating a query to the cloud database for a list of status identifiers associated with the item;

incrementally assigning each status identifier in the list a unique integer, beginning with 1;

assigning each status identifier in the list a different position in a binary number, based on a corresponding assigned unique integer;

traversing a status log in the cloud database and, for each row in which a status identifier is modified, assigning the status identifier a status binary value as a positive binary number based on an assigned position of the status identifier if the status identifier is set, an assigning the status binary value status identifier as a negative binary number based on the assigned position of the status identifier if the status identifier is unset;

combining any rows in the status log containing identical timestamps;

for each row in the status log, summing all the status binary values of all rows having timestamps older than a timestamp in a corresponding row;

based on the summed status binary values, adding, for each row in the status log, text indicating which status identifiers were set at the timestamp in the corresponding row; and causing the status log, comprising the text, to be rendered in a graphical user interface of the client application.

2. The system of claim 1, wherein the cloud database is an in-memory database.

3. The system of claim 1, wherein the item is identified in the cloud database by a unique serial number.

4. The system of claim 1, wherein the generating of the query to the cloud database for the list of status identifiers associated with the item comprises requesting a list of all distinct status codes from a table of status changes for items.

5. The system of claim 1, wherein the generating, incrementally assigning, assigning, traversing, combining, summing, and adding are performed by a structured query language (SQL) script.

6. The system of claim 5, wherein the SQL script is executed by a SQL processor of the cloud database.

7. The system of claim 6, wherein the adding comprises using a lead function.

8. A method comprising:

receiving, at a client application of a cloud database, a request for a status of an item referenced in the cloud database;

in response to the receiving, generating a query to the cloud database for a list of status identifiers associated with the item;

incrementally assigning each status identifier in the list a unique integer, beginning with 1;

assigning each status identifier in the list a different position in a binary number, based on a corresponding assigned unique integer;

traversing a status log in the cloud database and, for each row in which a status identifier is modified, assigning the status identifier a status binary value as a positive binary number based on an assigned position of the status identifier if the status identifier is set, an assigning the status binary value status identifier as a negative binary number based on the assigned position of the status identifier if the status identifier is unset;

combining any rows in the status log containing identical timestamps;

for each row in the status log, summing all the status binary values of all rows having timestamps older than a timestamp in a corresponding row;

based on the summed status binary values, adding, for each row in the status log, text indicating which status identifiers were set at the timestamp in the corresponding row; and causing the status log, comprising the text, to be rendered in a graphical user interface of the client application.

9. The method of claim 8, wherein the cloud database is an in-memory database.

10. The method of claim 8, wherein the item is identified in the cloud database by a unique serial number.

11. The method of claim 8, wherein the generating the query to the cloud database for the list of status identifiers associated with the item comprises requesting a list of all distinct status codes from a table of status changes for items.

12. The method of claim 8, wherein the generating, incrementally assigning, assigning, traversing, combining, summing, and adding are performed by a structured query language (SQL) script.

13. The method of claim 12, wherein the SQL script is executed by a SQL processor of the cloud database.

14. The method of claim 13, wherein the adding comprises using a lead function.

15. A non-transitory machine-readable medium storing instructions which, when executed by one or more processors, cause the one or more processors to perform operations comprising:

receiving, at a client application of a cloud database, a request for a status of an item referenced in the cloud database;

in response to the receiving, generating a query to the cloud database for a list of status identifiers associated with the item;

incrementally assigning each status identifier in the list a unique integer, beginning with 1;

assigning each status identifier in the list a different position in a binary number, based on a corresponding assigned unique integer;

traversing a status log in the cloud database and, for each row in which a status identifier is modified, assigning the status identifier a status binary value as a positive binary number based on an assigned position of the status identifier if the status identifier is set, an assigning the status binary value status identifier as a negative binary number based on the assigned position of the status identifier if the status identifier is unset;

combining any rows in the status log containing identical timestamps;

for each row in the status log, summing all the status binary values of all rows having timestamps older than a timestamp in a corresponding row;

based on the summed status binary values, adding, for each row in the status log, text indicating which status identifiers were set at the timestamp in the corresponding row; and causing the status log, comprising the text, to be rendered in a graphical user interface of the client application.

16. The non-transitory machine-readable medium of claim 15, wherein the cloud database is an in-memory database.

17. The non-transitory machine-readable medium of claim 15, wherein the item is identified in the cloud database by a unique serial number.

18. The non-transitory machine-readable medium of claim 15, wherein the generating the query to the cloud database for the list of status identifiers associated with the item comprises requesting a list of all distinct status codes from a table of status changes for items.

19. The non-transitory machine-readable medium of claim 15, wherein the generating, incrementally assigning, assigning, traversing, combining, summing, and adding are performed by a structured query language (SQL) script.

20. The non-transitory machine-readable medium of claim 19, wherein the SQL script is executed by a SQL processor of the cloud database.

* * * * *